US005743583A

United States Patent [19]
Lowe

[11] Patent Number: 5,743,583
[45] Date of Patent: Apr. 28, 1998

[54] AUXILIARY LOAD SUPPORTING APPARATUS

[76] Inventor: William E. Lowe, 10022 Dapple Grey Trail, Dewey, Ariz. 86327

[21] Appl. No.: 759,752

[22] Filed: Dec. 3, 1996

Related U.S. Application Data

[63] Continuation-in-part of Ser. No. 547,469, Oct. 24, 1995, abandoned.

[51] Int. Cl.⁶ .................................................. B60P 3/00
[52] U.S. Cl. .................................................. 296/3; 211/195
[58] Field of Search ................................. 296/3; 211/195, 211/200

[56] References Cited

U.S. PATENT DOCUMENTS

| | | | |
|---|---|---|---|
| 2,945,699 | 7/1960 | Berlye | 296/3 |
| 3,891,262 | 6/1975 | Brunel | 296/3 |
| 4,611,824 | 9/1986 | McIntosh | 296/3 |
| 4,854,628 | 8/1989 | Halberg | 296/3 |
| 5,002,324 | 3/1991 | Griffin | 296/3 |
| 5,037,152 | 8/1991 | Hendricks | 296/3 |
| 5,120,102 | 6/1992 | Cumbie | 296/3 |
| 5,316,190 | 5/1994 | Bullock | 296/3 |

*Primary Examiner*—Gary C. Hoge
*Attorney, Agent, or Firm*—Parsons & Goltry; Robert A. Parsons; Michael W. Goltry

[57] ABSTRACT

An auxiliary load supporting apparatus including a substantially rigid frame member receivable by portions of a bed of a pickup truck and having a movable frame member pivotally coupled thereto and movable from a first position and a second position for supporting a load superjacent the bed.

16 Claims, 4 Drawing Sheets

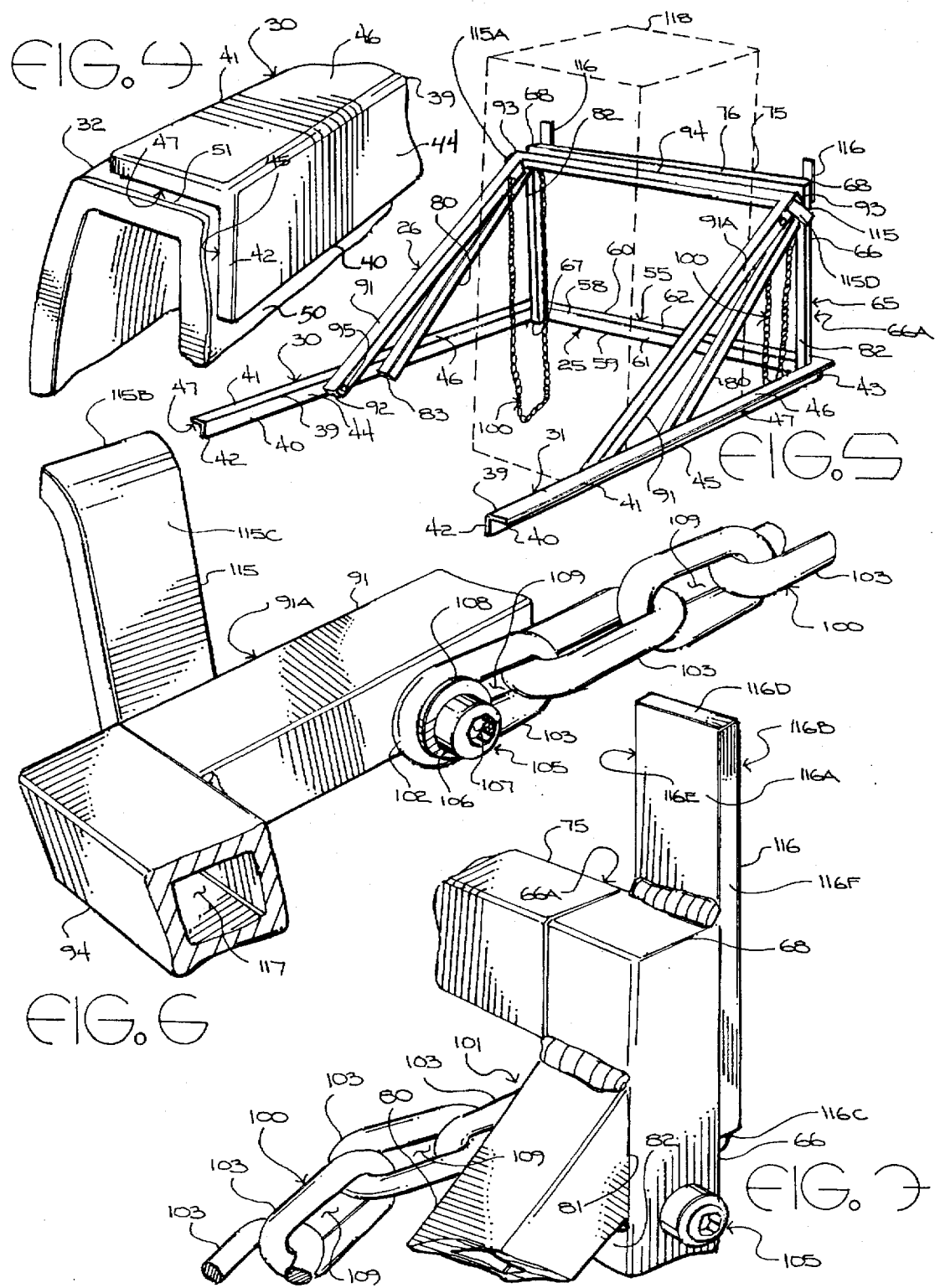

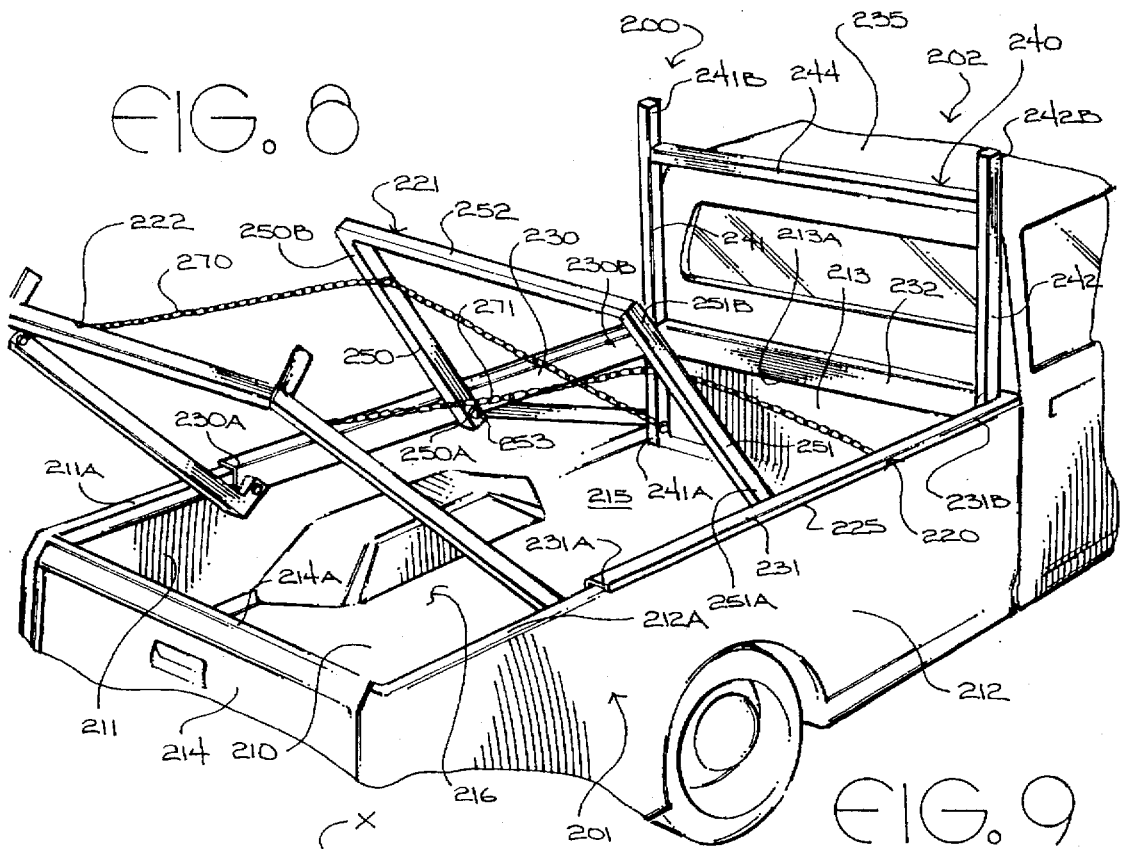
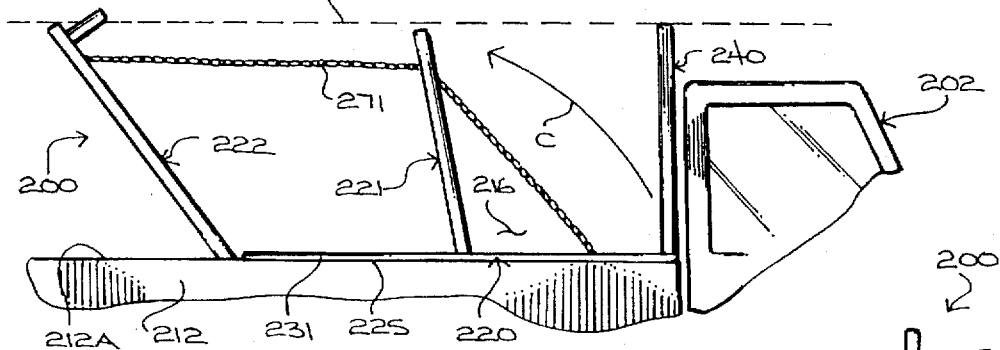
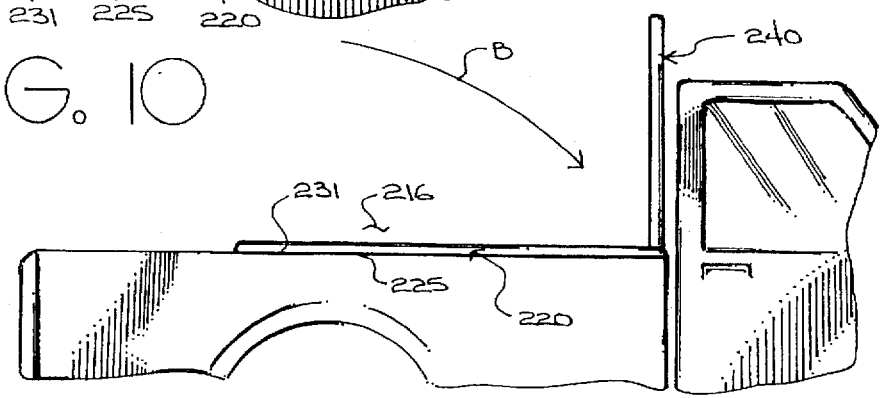

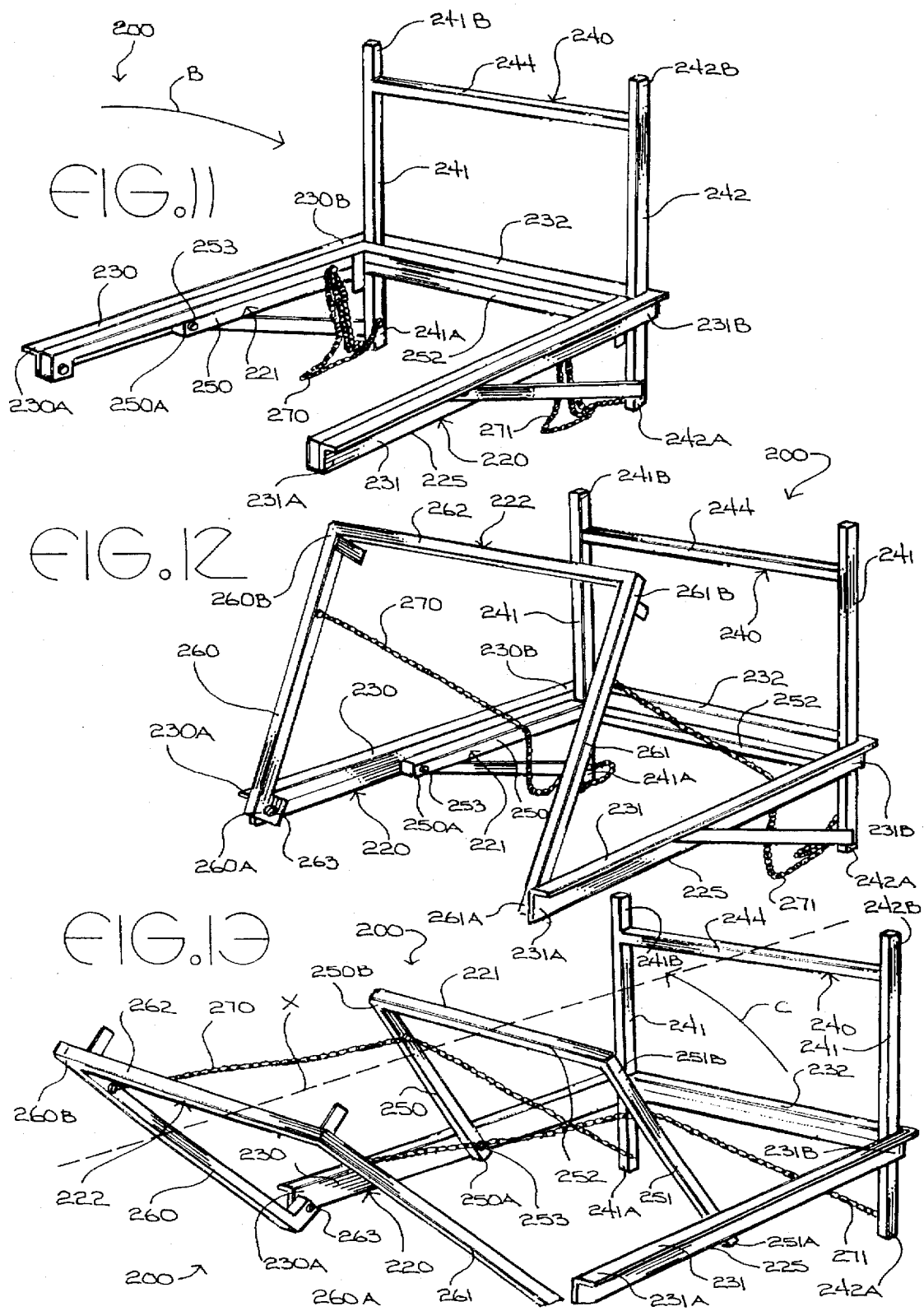

AUXILIARY LOAD SUPPORTING APPARATUS

CROSS-REFERENCE TO RELATED APPLICATION

The instant application is a continuation-in-part of applicant's copending application Ser. No. 08/547,469, entitled Auxiliary Load Supporting Apparatus, filed 24 Oct. 1995 now abandoned.

BACKGROUND OF THE INVENTION

1. Field of the Invention

This invention relates to load supporting apparatus.

More particularly, this invention relates to load supporting apparatus usable with pickup trucks.

In a further and more specific aspect, the instant invention relates to an auxiliary load supporting apparatus for a pickup truck having a rigid frame member and a plurality of movable frame members movable between a collapsed position and an extended position for supporting a load.

2. Prior Art

Pickup trucks have become increasingly popular vehicles throughout recent years, and are routinely used for recreational and work related activities. For instance, many recreationalists use the bed of pickup trucks as a convenient tool for transporting items such as motorcycles and other similar type motorized recreational vehicles, bikes, small boats such as kayaks, camping gear, and other recreational equipment. Additionally, construction workers routinely use pickup trucks for transporting materials and tools to and from various job sites. In short, there are a wide variety of uses of pickup trucks which make them very practical and useful vehicles.

The load or carrying capacity of pickup trucks is normally limited to the dimensions of the bed of the pickup. However, to enhance the carrying or load capacity of pickup trucks, the prior art has provided an array of auxiliary apparatus usable in combination with the bed of the pickup for supporting a load. For instance, one such apparatus includes a front rigid frame member engageable to the roof of the cab of a typical pickup, and a separate rear rigid frame member which is rigidly coupled to portions of the tailgate and the rear bumper. The rear frame member includes a telescoping frame portion telescopingly movable between a lower and upper position. This apparatus is ideal for hauling elongate objects such as surf boards, canoes above the roof top of the pickup. However, since the rear frame member is rigidly coupled to the tailgate and the rear bumper, the tailgate may not be accessed. Additionally, the rear frame member is normally clamped to portions of the tailgate when installed. This is inherently undesirable since the clamp tends to occasion damage to the tailgate after it has been repeatedly clamped to the tailgate. Additionally, since the front frame member is supported by the roof of the cab of the pickup, heavy loads can tend to dent the roof which can be frustrating, and expensive to fix.

Another exemplary auxiliary apparatus usable with the bed of a pickup is an elongate angularly adjustable frame member attachable to the respective sides of a pickup and may be used for suspending items such as chain saws above the floor of the bed. Although this apparatus is notable for safely and efficiently transporting items such as chain saws, its relatively small size prevents this apparatus from transporting larger items such as ladders, skis, surf boards, and other elongate items.

Other apparatus present in the prior art consist of essentially rigid elongate frame members attachable to one of the respective sides of the pickup for transporting items such as ladders and the like. Such apparatus provide a convenient means for transporting a ladder, but they may not be used for safely and efficiently transporting a larger number of elongate items. Furthermore, other apparatus provide a load supporting area located within the bed of the pickup itself, which prevents the bed from otherwise being used to transport additional items, and also inhibits access to the bed of the pickup.

As a result of the many deficiencies present in the prior art, certain new and useful improvements in auxiliary load supporting apparatus usable with pickup trucks become necessary.

It would be highly advantageous, therefore, to remedy the foregoing and other deficiencies inherent in the prior art.

Accordingly, it is an object of the present invention to provide a new and useful auxiliary load supporting apparatus usable with the bed of a pickup truck.

Another object of the present invention is to provide an auxiliary load supporting apparatus that is easy and inexpensive to manufacture.

And another object of the present invention is to provide an auxiliary load supporting apparatus usable with all types of pickups.

Still another object of the present invention is to provide an auxiliary load supporting apparatus that is easy to use.

Yet another object of the instant invention is to provide an auxiliary load supporting apparatus that is easy to install.

Yet still another object of the instant invention is to provide an auxiliary load supporting apparatus able to safely and easily transport a large number of elongate items.

And a further object of the invention is to provide an auxiliary load supporting apparatus usable with pickups for carrying a load without inhibiting access to the bed of the pickup.

Still a further object of the immediate invention is to provide an auxiliary load supporting apparatus that may be easily stored.

Yet a further object of the invention is to provide an auxiliary load supporting apparatus that may be compactly folded when coupled to the bed of a pickup when not in use.

And still a further object of the invention is to provide an auxiliary load supporting apparatus that occasions no damage to the pickup when carrying a load.

SUMMARY OF THE INVENTION

Briefly, to achieve the desired objects of the instant invention in accordance with a preferred embodiment thereof, provided is a substantially rigid frame member receivable by portions of a bed of a pickup truck and including an inverted generally U-shaped frame extending upwardly from a pair of spaced apart rails receivable by upper edges of the bed. Also included is an inverted generally U-shaped movable frame member pivotally coupled to the respective ones of the spaced apart rails and movable between a first position and a second position for supporting a load superjacent the bed. Also included are a pair of spaced apart links having inner ends coupled to the rigid frame member and outer ends coupled to the movable frame member for inhibiting pivotal movement of the movable frame member from the second position.

Further included is an auxiliary load supporting apparatus for a bed of a vehicle. In this embodiment, the auxiliary load supporting apparatus includes a base mounted to the bed and a first framework mounted to the base and having a transom superjacent the bed. Also included is a second framework pivotally mounted to the base spaced from the first framework and having a transom movable along pivotal traverse from a first position and a second position superjacent the bed. A third framework is also provided and is pivotally mounted to the base spaced from the second framework and having a transom movable along pivotal traverse from a first position and a second position superjacent the bed. The transom of the first framework, the transom of the second framework disposed in the second position, and the transom of the third framework disposed in the second position define a plane superjacent the bed upon which equipment may be stored. Also included are a pair of spaced apart links coupled to the first framework, the second framework and the third framework for inhibiting pivotal movement of the second framework and the third framework from the second position.

BRIEF DESCRIPTION OF THE DRAWINGS

The foregoing and further and more specific objects and advantages of the instant invention will become readily apparent to those skilled in the art from the following detailed description of preferred embodiments thereof taken in conjunction with the drawings in which:

FIG. 4 is an enlarged fragmentary perspective view of a portion of a rail of a base of the auxiliary load supporting apparatus of FIG. 1 engaging a portion of the bed of the vehicle, in accordance with a preferred embodiment of the present invention;

FIG. 5 is a perspective view of the auxiliary load supporting apparatus of FIG. 1 shown as it would appear in a collapsed orientation, in accordance with a preferred embodiment of the present invention;

FIG. 6 is an enlarged fragmentary perspective view of portions of a movable frame member of the auxiliary load supporting apparatus of FIG. 1 and having a chain coupled thereto, in accordance with a preferred embodiment of the present invention;

FIG. 7 is an enlarged fragmentary perspective view of a portion of a rigid frame member of the auxiliary load supporting apparatus of FIG. 1 and having a chain coupled thereto, in accordance with a preferred embodiment of the present invention;

FIG. 8 is a perspective view of an auxiliary load supporting apparatus shown as it would appear mounted to a bed of a vehicle, in accordance with an alternate embodiment of the present invention;

FIG. 9 is a side elevational view of the auxiliary load supporting apparatus of FIG. 8 shown as it would appear in an expanded orientation, in accordance with an alternate embodiment of the present invention;

FIG. 10 is a side elevational view of the load supporting apparatus of FIG. 8 shown as it would appear in a collapsed orientation, in accordance with an alternate embodiment of the present invention;

FIG. 11 is a perspective view of the auxiliary load supporting apparatus of FIG. 8 shown as it would appear in a collapsed orientation, in accordance with an alternate embodiment of the present invention;

FIG. 12 is a perspective view of the auxiliary load supporting apparatus of FIG. 11 shown as it would appear in a partially expanded orientation, in accordance with an alternate embodiment of the present invention; and FIG. 13 is a perspective view of the auxiliary load supporting apparatus of FIG. 12 shown as it would appear in an expanded orientation, in accordance with an alternate embodiment of the present invention.

DETAILED DESCRIPTION OF THE PREFERRED EMBODIMENT

Figure 1:
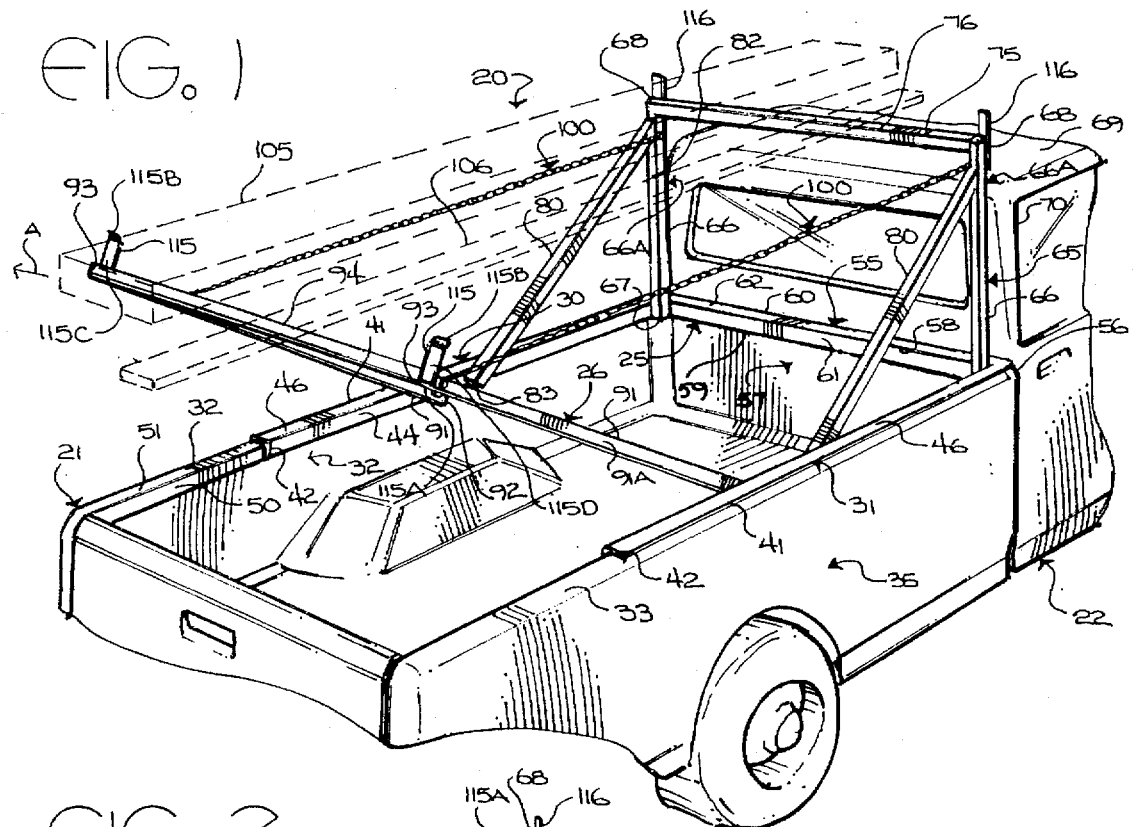
FIG. 1 is a perspective view of an auxiliary load supporting apparatus shown as it would appear mounted to a bed of a vehicle, in accordance with a preferred embodiment of the present invention.

Turning now to the drawings, in which like reference characters indicate corresponding elements throughout the several views, attention is first directed to FIG. 1 which illustrates a first embodiment of the instant invention comprising an auxiliary load supporting apparatus being generally designated by the reference character 20. The auxiliary load supporting apparatus 20 is illustrated as it would appear coupled to portions of a bed 21 of a pickup truck 22. The auxiliary load supporting apparatus 20 includes a rigid frame member 25 and a movable frame member 26 movably coupled thereto.

Figure 2:
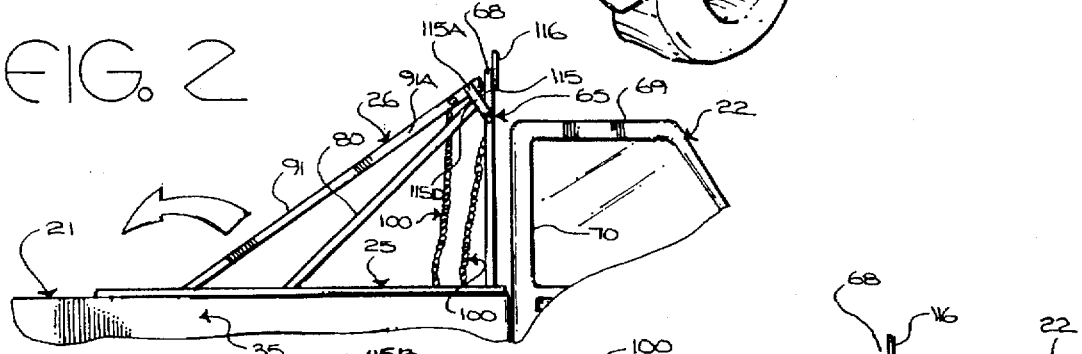
FIG. 2 is a side elevational view of the auxiliary load supporting apparatus of FIG. 1 and shown as it would appear in a collapsed orientation, in accordance with a preferred embodiment of the present invention.
Figure 3:
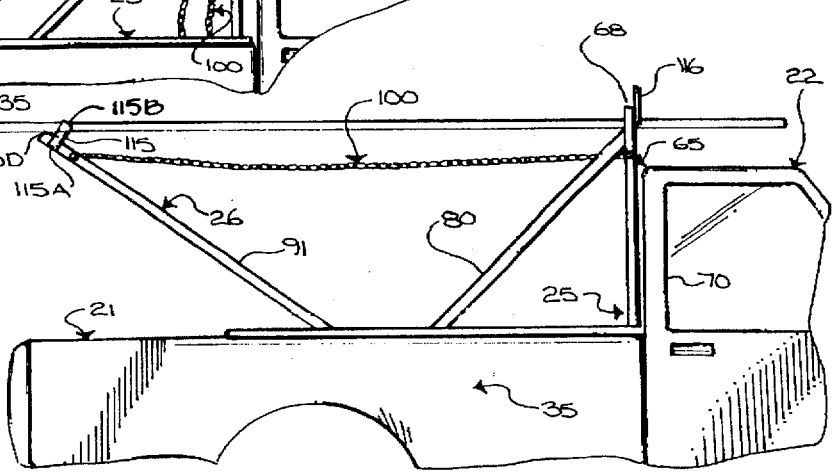
FIG. 3 is a side elevational view of the load supporting apparatus of FIG. 1 and shown as it would appear in an expanded orientation, in accordance with a preferred embodiment of the present invention.

With continuing reference to FIG. 1, and additional reference to FIG. 2, FIG. 3, and FIG. 5, rigid frame member 25 of auxiliary load supporting apparatus 20 includes a first elongate rail 30 and a second elongate rail 31 which are spaced apart and receivable over portions of upper edges 32 and 33 of the respective ones of sides 34 and 35 of bed 21 of pickup 22. Elongate rail 30 and elongate rail 31 each preferably include an inverted generally L-shaped elongate bracket member 39 including an elongate upstanding member 40 with an elongate support member 41 extending laterally therefrom, a free end 42 and a forward end 43. The upstanding member 40 includes an outer surface 44 and an inner surface 45. The support member 41 also includes an outer surface 46 and an inner surface 47.

The inner surfaces 45 and 47 of each elongate rail 30 and 31 are receivable by portions of the upper edges 32 and 33 of the respective sides 34 and 35 of the bed 31. With specific reference to FIG. 4, the inner surfaces 45 and 47 of elongate rail 30 are shown as receivable against outer surfaces 50 and 51 respectively of upper edge 32.

The rigid frame member 25 of the auxiliary load supporting apparatus 20 further includes an transom rail 55 receivable against the upper edge 56 of front end panel 57 of the bed 21, and interconnecting the elongate rails 30 and 31 at the forward ends 43. Like elongate rails 30 and 31, transom rail 55 includes an inverted generally L-shaped bracket member 58 including an elongate upstanding member 59 with an elongate support member 60 extending therefrom. Also, like elongate rails 30 and 31, the upstanding member 59 and the support member 60 each include an outer surface, 61 and 62 respectively, and an inner surface (not herein specifically shown) receivable about portions of the upper edge 56 of the front end panel 57. It will be understood that the elongate rails 30 and 31 and the intermediate rail 55 serve to provide a stable generally U-shaped base for auxiliary load supporting apparatus 20.

Next provided in combination with the rigid frame member is an inverted generally U-shaped frame 65 extending upwardly proximate the forward ends 43 of the elongate rails 30 and 31. The generally U-shaped frame 65 includes a pair of spaced apart upwardly extending members 66 having free ends 67 coupled proximate portions of the outer surfaces 44 of the elongate rails 30 and 31, and proximate portions of the inner surface 61 of the intermediate rail 55. Each upwardly extending member 66 also includes an upper end 68 each of which preferably extends above an upper surface 69 of a cab 70 of the pickup truck, although this is not essential. Further included is an upper elongate member 75 having an upper surface 76, and interconnecting the upper ends 68 of the upwardly extending members 66 which define opposing corners of the generally U-shaped frame 65.

With continuing reference to FIG. 1 and FIG. 5, and additional reference to FIG. 7, the rigid frame member 25 further includes a pair of downwardly extending brace members 80 each having an upper end 81 integrally attached to rear surfaces 82 of each respective upwardly extending member 66 proximate upper ends 68. Each brace member 80 further includes a free end 83 rigidly coupled to the inner surface 44 of each of the ones of the respective elongate rails, 30 and 31, and at a generally intermediate point between the forward end 43 and the free end 42. The brace members 80 serve as a support means for adding structural integrity to the auxiliary load supporting apparatus 20. The free ends 83 of the brace members 80 may be rigidly coupled to the inner surface 44 of each elongate rail, 30 and 31, by means of a bolt, welding, or any other preferable means suitable for rigidly coupling the brace member 80 to the elongate rails 30 and 31. Although the free ends 83 brace members 80 are shown as being coupled to the inner surface 44 of each elongate rail, 30 and 31, it will be readily appreciated by those having ordinary skill in the art that the free ends 83 of the brace members 80 may be rigidly and selectively coupled elsewhere along the length of the elongate rails, 30 and 31, as is suitable and practical.

With continuing reference to the above referenced figures, the movable frame member 26 can be seen as including an inverted generally U-shaped configuration. The movable frame member 26 includes a pair of spaced apart elongate support members 91 having free ends 92 pivotally coupled proximate the inner surface 44 of each respective elongate rail, 30 and 31, at an intermediate position between the point at which the free ends 83 of the brace members 80 meet the elongate rails, 30 and 31, and the free ends 42 of each of the respective elongate rails 30 and 31. With respect to the preferred embodiment, the free ends 92 are preferably pivotally coupled closer to the free ends 83 of the brace members 80, than to the free ends 42 of the elongate rails 30 and 31. The support members 91 further include upper ends 93 which are interconnected by an upper elongate support member 94, each connection of which defining opposing corners.

The movable frame member 26 has been herein described as being pivotally mounted to portions of the rigid frame member 25. Consistent with the preferred embodiment of the instant invention, each of the free ends 92 of the movable frame member are preferably pivotally mounted to the inner surface 44 of each respective elongate rail, 30 and 31, by means of a bolt member 95 extending through portions of the support members 91 and coupled to portions of each elongate rail 30 and 31. As a result of such a configuration, the movable frame member 26 is selectively and pivotally movable from a first position, of which can be seen in FIG. 2 and FIG. 3, and a second position of which can be seen in FIG. 1 and FIG. 3. In the first position, the movable frame member 26 is seen as being pivotally disposed close to the inverted generally U-shaped frame 65. In this first position, the movable frame is folded such that it rests against portions of the brace members 80 and portions of the inverted generally U-shaped frame 65. In the second position, the movable frame member is seen as being selectively and pivotally disposed away from or spaced apart from the inverted generally U-shaped frame 65.

As can be seen with specific reference to FIG. 1, FIG. 3, FIG. 6, and FIG. 7, the instant invention also includes a pair of spaced apart links 100, each having an inner end 101 fixedly coupled to portions of respective ones of the upwardly extending members 66 proximate free ends 68. Each link 100 also includes an outer end 102 fixedly coupled to portions of respective ones of the elongate support members 91 of the movable frame member 26 proximate upper ends 93. When disposed in the second position, the spaced apart links 100 function as a stop means for inhibiting pivotal movement of the movable frame member beyond the second position. In the second position, as can be seen with specific reference to FIG. 1 and FIG. 3, elongate members, such as elongate member 105 and 106 as illustrated, may be selectively placed upon the auxiliary load supporting apparatus 20, specifically coming to rest upon the upper surface 76 of the upper elongate member 75, and portions of the upper elongate support member 94 of the movable frame member 26. With the pair of spaced apart links 100 retaining the movable frame member 26 in the second position, the position of which may be varied by varying the length of the respective spaced apart links 100, the upper elongate member 75 and the upper elongate support member 94 provide a convenient and preferably Level support surface for supported selected elongate items.

With continuing and specific reference to FIG. 6 and FIG. 7, each spaced apart link 100 comprises a chain consisting of a plurality of interlinked link members 103 preferably constructed of a type of metal such as steel or the like. One link members 103 defining the outer end 102 of each respective spaced apart chain 100 is shown as coupled to a retaining bolt 105. The retaining bolt 105 is shown as including a generally cylindrical headed end 106 having a recess 107 specifically sized for receiving an Allen wrench for selectively tightening or loosening the retaining bolt 105 as desired upon rotation in a certain direction. The retaining bolt 105 includes an end (not herein specifically shown) received by washer 108, and through a hole 109 of link 103, and also received through and coupled to portions of respective ones of the support members 91. The inner ends 101 of the spaced apart links 100 are coupled to portions of the respective ones of the upwardly extending members 66 in the same fashions as the outer ends 102.

It will be appreciated by those having ordinary skill, that although the spaced apart links 100 have been herein specifically described is a conventional chain, any preferred linking substance may be used such as rope or cable. Additionally, the stop means desirably functions for inhibiting pivotal movement of the movable frame member 26 beyond the second position. Therefore, it will be further appreciated by those having ordinary skill that to inhibit motion of the movable frame member beyond the second position, substantially rigid elongate members may be substituted in lieu of the spaced apart links for maintaining the auxiliary load supporting apparatus 20 in the second position.

When the auxiliary load supporting apparatus 20 is disposed in the first configuration, of which is depicted in FIG.

5, complete access to the bed 21 of the pickup 22 is facilitated so that the bed of the pickup may be used for carrying a wide variety of selected items such as box member 118 and other selected items. Additionally, when the auxiliary load supporting apparatus 20 is disposed in the second configuration, complete access to the bed 21 of the pickup 22 is still not inhibited, allowing one to selectively use the bed 21 for hauling selected items, while allowing simultaneous use of the auxiliary load supporting apparatus 20 for hauling selected items thereon.

With reference to FIG. 1 and FIG. 6, extending in a generally upwardly direction are further included a pair of spaced apart members 115 rigidly carried proximate respective outer surfaces 91A of each respective ones of the support members 91 proximate each free end 92. Each member 115 includes a lower end 115A, a free end 115B, an inner side surface 115C, and an outer side surface 115D. Additionally, extending in a generally upwardly direction are also present another pair of spaced apart members 116 rigidly carried proximate respective outer front surfaces 66A of the upwardly extending member 66 proximate the upper ends 68. Each spaced apart member 116 includes an inner side surface 116A, an outer side surface 116B, a lower end 116C, a free end 116D, inner side edge 116E, and outer side edge 116F. When a load such as elongate members 105 and 106 are placed upon the auxiliary load supporting apparatus 20 when it is disposed in the second position, the elongate members 105 and 106 are selectively disposed therebetween each of the respective spaced apart member 115 and 116. As a result, the elongate members 105 and 106 are prevented from sliding laterally, such as in the direction indicated by the arrowed line A in FIG. 1, and thus falling off of the auxiliary load supporting apparatus 20 as they bear against the inner surfaces 115C selectively of members 115, and the inner side edges 166E selectively of members 116. Essentially, the pairs of spaced apart members, 115 and 116, function as a restraining means for inhibiting the load from falling from the auxiliary load supporting apparatus 20 when disposed in the second position.

As can be seen in FIG. 6, upper elongate support member 94 is constructed of a generally tubular material having a generally square cross section with a generally square bore 117 extending therethrough, and is preferably fabricated from a type of metal such as steel, aluminum, or other suitably rigid substance. With respect to the preferred embodiment, upwardly extending members 66, upper elongate member 75, brace members 80, and support members 91 are all constructed and fabricated of the same material as the upper elongate support member 94. It will be readily appreciated by those having ordinary skill in the art, that the auxiliary load supporting apparatus 20 may be constructed of any suitable and substantially rigid material without limitation which is suitable for use in combination with the instant invention.

Reference is now directed to FIG. 8 illustrating a perspective view of an auxiliary load supporting apparatus 200 shown as it would appear mounted to a bed 201 of a vehicle 202, in accordance with an alternate embodiment of the present invention. In general terms, vehicle 202 is of a variety normally referred to as a pickup truck, much like pickup truck 22 previously discussed, although this is not essential and other vehicle types may be used having beds similar to bed 201. Bed 201 is generally comprised of a bottom panel 210, opposite side panels 211 and 212 and opposite end panels 213 and 214, cooperating to bound a storage area 215. Side panels 211 and 212 and end panels 213 and 214 each include an upper edge 211A, 212A, 213A, and 214A, respectively, cooperating together to bound an opening 216 into storage area 215. The arrangement of bed 201 is well known to those of ordinary skill further details of which will not be herein specifically addressed.

Auxiliary load supporting apparatus 200 is generally comprised of a rigid frame member 220, a second framework 221 and a third framework 222. Rigid frame member 220 includes a base 225 having a first elongate rail 230, a second elongate rail 231 and a transom rail 232. First elongate rail 230 and second elongate rail 231 each include a distal end 230A and 231A and a proximal end 230B and 231B. Transom rail 232 interconnects proximal end 230B to proximal end 231B. First elongate rail 230, second elongate rail 231 and transom rail 232 are substantially identical to first elongate rail 30, second elongate rail 31 and transom rail 55 previously discussed in combination with auxiliary load supporting apparatus 20 previously discussed, further details of which will not be further addressed as they will be readily understood.

Base 225 is generally U-shaped with first elongate rail 230 and second elongate rail 231 disposed in a generally parallel and spaced-apart relation and mounted upon upper edges 211A and 212A of side panels 211 and 212, respectively, with transom rail 232 mounted upon upper edge 213A of end panel 213 located proximate cab 235 of vehicle 222. With continuing reference to FIG. 8 and additional reference to FIG. 11, rigid frame member 220 further includes a first framework 240. First framework 240, preferably having a generally U-shaped orientation, includes a pair of upright members 241 and 242, each having a lower end 241A and 242A and an upper end 241B and 242B, respectively. Upright member 241 is fixed to base 225 proximate the point where transom rail 232 intersects first elongate rail 230 and at a position intermediate lower end 241A and upper end 241B. Upright member 242 is fixed to base 225 proximate the point where transom rail 232 intersects second elongate rail 231 and at a position intermediate lower end 241A and upper end 241B. With respect to this embodiment, base 225 is fixed to each upright member 241 and 242 closer to their respective lower ends 241A and 242A than to their respective upper ends 241B and 242B, although this is not essential.

As shown in FIG. 8, when auxiliary load supporting apparatus 200 is mounted to bed 221, lower ends 241A and 242B of upright members 241 and 242 rest upon bottom panel 210 proximate the location where end panel 213 intersects opposed side panels 211 and 212, and extend upwardly therefrom with upper ends 241B and 242B positioned somewhat superjacent cab 235. Upright members 241 and 242 are disposed in a generally upright, spaced-apart and generally parallel relation. A transom 244 interconnects upright members 241 and 242 proximate a position somewhat spaced from upper ends 241B and 242B. In the present embodiment, transom 244 is positioned superjacent, opposed and generally parallel to transom rail 232.

With continuing reference to FIG. 8, second framework 221, preferably having an inverted generally U-shaped configuration, includes a pair of spaced apart elongate support members 250 and 251. Elongate support members 250 and 251 each have a free end 250A and 251A pivotally coupled to base 225. In this embodiment, free end 250A is coupled to first elongate rail 230 proximate a location generally intermediate proximal end 230B and distal end 230A. Additionally, free end 251A is coupled to second elongate rail 231 proximate a location intermediate proximal end 231B and distal end 231A. Each elongate support member 250 and 251 includes an upper end 250B and 251B interconnected by a transom 252. Furthermore, each free end 250A and 251A of second framework 221 is shown pivotally coupled to base 225 by means of a bolt 253, although this is not essential and other pivotal coupling means may be used.

Referring now to FIG. 12, like second framework 221, third framework 222, preferably having an inverted generally U-shaped configuration, includes a pair of spaced apart elongate support members 260 and 261. Elongate support members 260 and 261 each have a free end 260A and 261A pivotally coupled to base 225. In this embodiment, free end 260A is pivotally coupled to first elongate rail 230 proximate distal end 230A. Additionally, free end 261A is pivotally coupled to second elongate rail 231 proximate distal end 231A. Each elongate support member 260 and 261 includes an upper end 260B and 261B interconnected by a transom 262. Furthermore, each free end 260A and 261A of third framework 222 is shown pivotally coupled to base 225 by means of a bolt 263, although this is not essential and other pivotal coupling means may be used.

Second framework 220 and third framework 222 are movable between a collapsed orientation and an expanded orientation. In particular, in FIG. 11 auxiliary load supporting apparatus 200 is shown as it would appear in a collapsed orientation. In the collapsed orientation, transom 262 of third framework 222 rests on top of transom 252 of second framework 221, each being positioned proximate transom rail 232 of base 225. Furthermore, portions of elongate support members 260 and 261 of third framework 222 rest upon elongate support members 250 and 251 of second framework 221 proximate to and along first and second elongate rails 230 and 231, respectively. In this manner, and as clearly shown in FIG. 10, second framework 221 and third framework 222 are completely out of the way of opening 216 into storage area 215 of bed 201 thus facilitating unobstructed access to opening 216.

With attention directed to FIG. 9 and FIG. 13, auxiliary load supporting apparatus 200 is shown as it would appear in the expanded orientation. In the expanded orientation, second framework 221 and third framework 222 extend upwardly from base 225 with transom 244 of first framework, transom 252 of second framework 221 and transom 262 of third framework 222 defining a plane X as indicated by the dotted line in FIG. 9 and FIG. 13. Like auxiliary load apparatus 20, when auxiliary load apparatus 200 is disposed into the expanded orientation, equipment or other items can be placed on top of transoms 244, 252 and 262 of first, second, and third frameworks 240, 221 and 222, and supported thereon along plane X immediately superjacent opening 216 for storage and/or transport.

To dispose auxiliary load supporting apparatus 200 into the expanded orientation from the collapsed orientation, second framework 221 and third framework may be pivotally urged in ascending pivotal traverse in the direction indicated by the arcuate arrowed line C in FIG. 9 and FIG. 13. In addition, to dispose auxiliary load supporting apparatus 200 into the collapsed orientation from the expanded orientation, second framework 221 and third framework may be pivotally urged in descending pivotal traverse in the direction indicated by the arcuate arrowed line B in FIG. 10 and FIG. 11.

As shown in FIG. 13, auxiliary load supporting apparatus 200 further includes a pair of links 270 and 271. Preferably a chain or the like, link 270 interconnects lower end 241A of upright member 241, upper end 250B of elongate support member 250 of second framework 221 and upper end 260B of elongate support member 260 of third framework 222.

Similarly, preferably a chain or the like, link 271 interconnects lower end 242A of upright member 242, upper end 251B of elongate support member 251 of second framework 221 and upper end 261B of elongate support member 261 of third framework 222. When disposed in the expanded orientation, links 270 and 271 function as a means for maintaining the second and third frameworks, 221 and 222, in the expanded orientation, although other means may be used.

Various changes and modifications to the embodiment herein chosen for purposes of illustration will readily occur to those skilled in the art. To the extent that such modifications and variations do not depart from the spirit of the invention, they are intended to be included within the scope thereof which is assessed only by a fair interpretation of the following claims.

Having fully described the invention in such clear and concise terms as to enable those skilled in the art to understand and practice the same, the invention claimed is:

1. An auxiliary load supporting apparatus for a bed of a vehicle, comprising:
 a base mounted to said bed;
 a first framework mounted to said base and having a transom superjacent said bed;
 a second framework pivotally mounted to said base spaced from said first framework and having a transom movable between a first position and a second position superjacent said bed;
 a third framework pivotally mounted to said base spaced from said second framework and having a transom movable between a first position and a second position superjacent said bed;
 whereby said transom of said first framework, said transom of said second framework in said second position, and said transom of said third framework in said second position define a plane superjacent said bed along which equipment may be placed for storage and transport.

2. The auxiliary load supporting apparatus of claim 1, wherein said base includes a first elongate rail receivable upon an upper edge of a side panel of said bed, a second elongate rail receivable upon an upper edge of an opposed side panel of said bed and a transom rail receivable upon an upper edge of an end panel of said bed and interconnecting a proximal end of said first elongate rail to a proximal end of said second elongate rail.

3. The auxiliary load supporting apparatus of claim 2, wherein said first framework includes an inverted, generally U-shaped frame extending upwardly from said base proximate said proximal end of said first elongate rail and said proximal end of said second elongate rail.

4. The auxiliary load supporting apparatus of claim 3, wherein said second framework includes an inverted generally U-shaped frame pivotally mounted to said first elongate rail and said second elongate rail and extending upwardly therefrom, said second framework spaced from said first framework and movable along pivotal traverse between said first position and said second position superjacent said bed.

5. The auxiliary load supporting apparatus of claim 4, wherein said third framework includes an inverted generally U-shaped frame pivotally mounted to said first elongate rail and said second elongate rail and extending upwardly therefrom, said third framework spaced from said second framework and movable along pivotal traverse between said first position and said second position superjacent said bed.

6. The auxiliary load supporting apparatus of claim 1, further including means for maintaining said second framework and said third framework in said second position.

7. The auxiliary load supporting apparatus of claim 6, wherein said means includes a pair of links interconnecting said first framework, said second framework and said third framework.

8. The auxiliary load supporting apparatus of claim 7, wherein each one of said pair of links includes a chain.

9. For a vehicle of a type having a bed including a bottom panel, opposite side panels and an end panel cooperating to bound a storage area and having upper edges of said panels correspondingly bounding an opening into said storage area, an auxiliary load supporting apparatus, comprising:

a base mounted to said bed;

a first framework mounted to said base and having a transom superjacent said opening;

a second framework pivotally mounted to said base spaced from said first framework and having a transom movable from a first position and a second position superjacent said opening;

a third framework pivotally mounted to said base spaced from said second framework and having a transom movable from a first position and a second position superjacent said opening;

whereby said transom of said first framework, said transom of said second framework in said second position, and said transom of said third framework in said second position define a plane superjacent said opening along which equipment may be placed for storage and transport.

10. The auxiliary load supporting apparatus of claim 9, wherein said base includes a first elongate rail receivable upon the upper edge of one of the opposed side panels of the bed, a second elongate rail receivable upon an upper edge of another one of the opposed side panels of the bed, and a transom rail receivable upon the upper edge of the end panel of the bed and interconnecting a proximal end of said first elongate rail to a proximal end of said second elongate rail.

11. The auxiliary load supporting apparatus of claim 10, wherein said first framework includes an inverted, generally U-shaped frame extending upwardly from said base proximate said proximal end of said first elongate rail and said proximal end of said second elongate rail.

12. The auxiliary load supporting apparatus of claim 11, wherein said second framework includes an inverted generally U-shaped frame pivotally mounted to said first elongate rail and said second elongate rail and extending upwardly therefrom, said second framework spaced from said first framework and movable along pivotal traverse between said first position unobstructing said opening and said second position superjacent said opening.

13. The auxiliary load supporting apparatus of claim 12, wherein said third framework includes an inverted generally U-shaped frame pivotally mounted to said first elongate rail and said second elongate rail and extending upwardly therefrom, said third framework spaced from said second framework movable along pivotal traverse between said first position unobstructing said opening and said second position superjacent said opening.

14. The auxiliary load supporting apparatus of claim 10, further including means for maintaining said second framework and said third framework in said second position.

15. The auxiliary load supporting apparatus of claim 14, wherein said means includes a pair of links interconnecting said first framework, said second framework and said third framework.

16. The auxiliary load supporting apparatus of claim 15, wherein each one of said pair of links includes a chain.

* * * * *